UNITED STATES PATENT OFFICE.

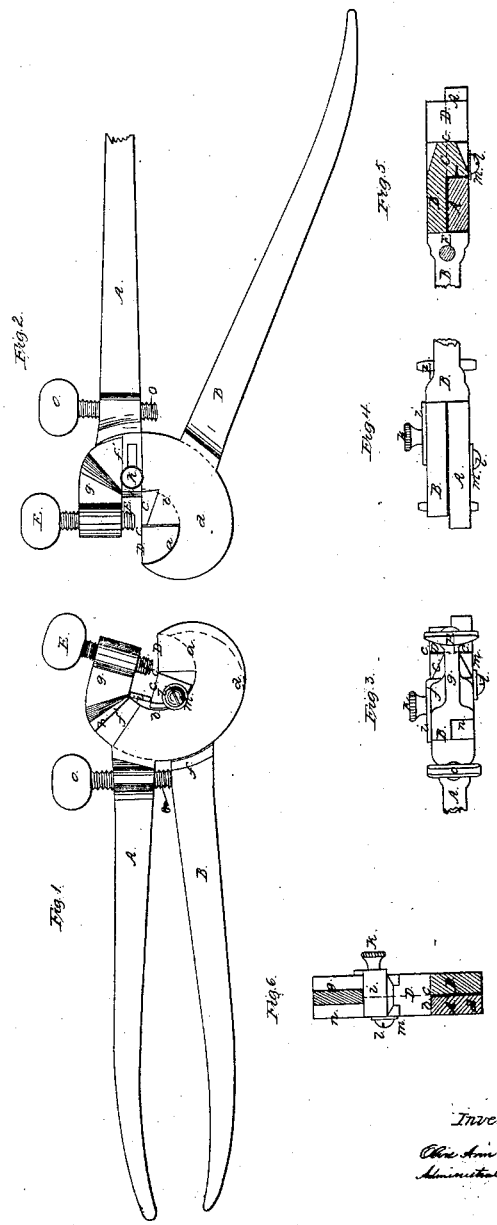

OLIVE ANN BROOKS, OF GREAT FALLS, NEW HAMPSHIRE, ADMINISTRATRIX OF LEBBEUS BROOKS, DECEASED.

SAW-SET.

Specification of Letters Patent No. 23,434, dated March 29, 1859.

*To all whom it may concern:*

Be it known that LEBBEUS BROOKS, late of Great Falls, in the county of Strafford and State of New Hampshire, but now deceased, did invent a new and useful or Improved Saw-Set, and whereas, in trust for the heirs of the said deceased, I, OLIVE ANN BROOKS, widow of the said LEBBEUS BROOKS, and administratrix of his estate, have applied to the Commissioner of Patents for Letters Patent on the said saw-set; now, therefore, I do hereby declare that the said invention is fully described and represented in the following specification and the accompanying drawings, of which—

Figure 1, is an elevation of one side, and Fig. 2, an elevation of the other side of such saw set. Fig. 3, is a top view, and Fig. 4, a bottom view of it. Fig. 5, is a horizontal section and Fig. 6, a transverse section of it.

The nature of the improvement consists in a peculiar arrangement and application of benders and a bending screw together and with respect to two handles whereby not only is a fulcrum pin, for the levers to work on dispensed with, but the center of motion of the benders is at their line of contact or the vertex of the angle made by them.

The particular advantages attendant on the improvement are, not only the absence of a fulcrum pin, which is very liable to become injured or broken by the great pressure usually brought upon it, but great simplicity and strength of construction.

In the drawings, A and B, are two handles or levers, one of which is made to lap on the other. Each of the said levers carries and has extending from it, laterally, one of the projections or benders C, D, whose upper surfaces, while the saw set is being used, are employed in connection with a screw E, in bending the saw tooth. Each of the benders extends laterally from its lever into a sectoral recess $a$, or $b$, formed in the other lever or handle as shown in Figs. 1, and 2. The curve of the arc of each recess is struck from the point or line $c$, of contact of the two benders. Furthermore, the bender is sectoral in form as shown in the said figures, its upper surface being shaped as exhibited in the drawings. Furthermore, that part, $d$, of the lever, A, which supports the front bender is curved to the arc of a circle whose center is the point, $c$, and is kept up to the rear bearer by means of a projection, $f$, from the lower lever B. A similarly curved extension of the lever B extends upward from it as seen in Fig. 2, and has an arm $g$ extended from it for the purpose not only of supporting the bending screw, E, (arranged as shown in the drawings) but of sustaining an adjustable gage $i$, which rests on the upper surface of the rearmost bender and is so constructed and applied to the part $f'$, by means of a set screw $k$, as to be capable of being adjusted nearer to or farther from the point $c$, as occasion may require.

A screw $l$ is screwed into the rear bender and on a metallic washer $m$, so as to maintain the two levers in connection. A stop $n$, projecting from the arm $g$, serves to arrest the movement of the handles apart from one another when the upper surfaces of the two benders are in a straight line or a plane. Besides such, a stop screw $o$, extending down through the upper handle in the position shown in Figs. 1, and 2, furnishes a means of regulating the angle which the benders are to have for setting the tooth of a saw. Preparatory to operating with the said sawset, the saw is to be placed on the two benders and with its teeth against the gage while the levers are opened apart. Next, the bending screw is to be screwed down so as to touch or nearly touch the saw. This having been done if the levers or handles are pressed toward one another, the action of the benders and the bending screw will be such as to bend the saw where it may be directly between them.

What is herein claimed as the invention of the said LEBBEUS BROOKS is—

The arrangement and application of the benders and bending screw together, and with respect to the two handles substantially as set forth, whereby the center of motion of the benders is at the place of contact or the vertex of the angle of their upper surfaces and no fulcrum pin is employed for the support and connection of the levers.

In testimony whereof, I have hereunto set my signature.

OLIVE ANN BROOKS,
*Administratrix of the estate of L. Brooks, deceased.*

Witnesses:
LEVI W. GILMAN,
ENOCH PERKINS.